United States Patent
Belvin et al.

(10) Patent No.: US 7,831,433 B1
(45) Date of Patent: Nov. 9, 2010

(54) SYSTEM AND METHOD FOR USING CONTEXT IN NAVIGATION DIALOG

(75) Inventors: Robert Belvin, Malibu, CA (US); Michael Daily, Thousand Oaks, CA (US); Narayan Srinivasa, Oak Park, CA (US); Kevin R. Martin, Oak Park, CA (US); Craig A. Lee, Los Angeles, CA (US); Cheryl Hein, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 914 days.

(21) Appl. No.: 11/704,790

(22) Filed: Feb. 9, 2007

Related U.S. Application Data

(63) Continuation-in-part of application No. 11/051,747, filed on Feb. 3, 2005, now Pat. No. 7,379,870.

(51) Int. Cl.
  *G10L 21/06* (2006.01)
(52) U.S. Cl. .................................. 704/275
(58) Field of Classification Search ................ 704/275
  See application file for complete search history.

(56) References Cited

U.S. PATENT DOCUMENTS

| | | | | |
|---|---|---|---|---|
| 6,078,865 A | * | 6/2000 | Koyanagi | 701/211 |
| 6,144,318 A | * | 11/2000 | Hayashi et al. | 340/995.19 |
| 6,317,691 B1 | | 11/2001 | Narayan et al. | |
| 6,480,786 B2 | * | 11/2002 | Watanabe et al. | 701/211 |
| 6,567,744 B1 | * | 5/2003 | Katayama et al. | 701/209 |
| 6,608,910 B1 | | 8/2003 | Srinivasa et al. | |
| 7,260,473 B2 | * | 8/2007 | Abe et al. | 701/200 |
| 7,424,363 B2 | * | 9/2008 | Cheng et al. | 701/211 |
| 7,463,975 B2 | * | 12/2008 | Bruelle-Drews | 701/209 |
| 7,474,960 B1 | * | 1/2009 | Nesbitt | 701/209 |
| 7,502,685 B2 | * | 3/2009 | Nakamura | 701/211 |
| 7,650,237 B2 | * | 1/2010 | Aoto | 701/212 |
| 2003/0235327 A1 | | 12/2003 | Srinivasa | |

OTHER PUBLICATIONS

Bugmann, G., "Challenges in Verbal Instruction of Domestic," Proceedings of the 1st International Workshop on Advances in Service Robotics, Bardolino, Italy, Mar. 13-15, 2003, pp. 112-116.

Theocharis Kyriacou, et al., "Vision-Based Urban navigation Procedures for Verbally Instructed Robots," Proceedings of the 2002 IEEE/RSJ Intl. Conference on Intelligent Robots and Systems (IROS'02) EPFL,Lausanne, Switzerland, Oct. 2002, pp. 1326-1331.

(Continued)

*Primary Examiner*—Susan McFadden
(74) *Attorney, Agent, or Firm*—Tope-McKay & Assoc.

(57) ABSTRACT

Described is a navigation system. The navigation system comprises a route planning module and a route guidance module. The route planning module is configured to receive a request from a user for guidance to a particular destination. Based on a starting point, the route planning module determines a route from the starting point to the particular destination. The route guidance module is configured to receive the route, and based on the route and current location of the user, provide location-specific instructions to the user. The location-specific instructions include reference to specific visible objects within the vicinity of the user.

33 Claims, 5 Drawing Sheets

OTHER PUBLICATIONS

Lauria, S., et al., "Converting Natural Language Route Instructions into Robot-Executable Procedures," Proceedings of the 2002 IEEE Int. Workshop on Robot and Human Interactive Communication (Roman'02), Berlin, Germany, pp. 223-228.

Lauriar, S., et al., "Training personal Robots Using Natural Language Instruction," IEEE Intelligent Systems, Sept./Oct. 2001, vol. 16, No. 5.

MaaB, W., et al., "Visual Grounding of route Descriptions in Dynamic Environments," In: R.K. Srihari (ed.), Proc. Of the AAAI Fall Symposium on Computational Models for Integrating Language and Vision, Cambridge, MA, 1995.

Gapp, K.-P., "Object Localization: Selection of Optimal Reference Objects," In: A. U. Frank, W. Kuhn (eds), Spatial Information Theory: A Theoretical Basis for GIS, Proc. Of the Int. Conference COSIT'95, Semmering, Austria, Berlin, Heidelberg: Springer, 1995.

Schirra, J.R.J., et al., "From Image Sequences to Natural Language: A First Step towards Automatic Perception and Description of Motions," Applied Artificial Intelligence, 1, 287-305, 1987.

Herzog, G., and Wazinski, P., "Visual Translator: Linking Perceptions and Natural Language Descriptions," Artificial Intelligence Review, 8(2): 175-187, 1994.

Fry, J., et al., "Natural Dialogue with the Jijo-2 Office Robot," In Proceedings of the IEEE/RSJ International Conference on Intelligent Robots and Systems IROS-98, pp. 1278-1283, Victoria, B.C., Canada, Oct. 1998.

Laengle, T., et al., "KANTRA—A Natural Language Interface for Intelligent Robots," Proceedings of the 4th International Conference on Intelligent Autonomous Systems, Mar. 1995.

Horn, B., et al., "Determining Optic Flow," 1981, Artificial Intelligence, vol. 17, pp. 185-203.

Faugeras, O., "Three-dimensional Computer Vision—A Geometric Viewpoint," 1993, MIT Press.

Rohr, K., "Towards model-based recognition of human movements in image sequences," 1994, Computer Vision, Graphics and Image Processing: Image Understanding, vol. 59, pp. 94-115.

Curio, C., et al., "Walking Pedestrian Recognition," in Proc. IEEE Intl. Conf. On Intelligent Transportation Systems, pp. 292-297, Oct. 1999.

Wohler, C., et al., A Time Delay Neural Network Algorithm for Real-time Pedestrian Detection, In Proc. Of IEEE Intelligent Vehicles Symposium, pp. 247-251, Oct. 1998.

Wachter, S., et al., "Tracking Persons in Monocular Image Sequences," Computer Vision and Image Understanding, vol. 74, No. 3, pp. 174-192, Jun. 1999.

Pentland, A., et al., "Recovery of non-rigid motion and structure," 1991, IEEE Trans. On Pattern Analysis and Machine Intelligence, vol. 13, pp. 730-742.

Wren, C., et al., "Pfinder: Real-Time Tracking of the Human Body," SPIE, vol. 2615, pp. 89-98, 1996.

Xu, L.Q., et al., "Neural networks in human motion tracking—An experimental study," in Proc. Of 7th British machine Vision Conference, vol. 2, pp. 405-414, 1996.

Masoud, O., et al., "A robust real-time multi-level model-based pedestrian tracking system," in Proc. Of the ITS America Seventh Annual Meeting, Washington DC, Jun. 1997.

Dubuisson, M., et al., "Contour Extraction of Moving Objects in Complex Outdoor Scenes," International Journal of Computer Vision, vol. 14, pp. 83-105.

Papageorgiou, C., et al., "A Trainable Pedestrian Detection System," in Proc. Of IEEE Intelligent Vehicles Symposium, pp. 241-246, Oct. 1998.

Zhao, L., et al., "Stereo and Neural Network-based Pedestrian Detection," in Proc. Of IEEE Intl. Conf on Intelligent Transportation Systems, pp. 298-303, Oct. 1999.

Broggi, A., et al., "Shape-based Pedestrian Detection," Proc. Of IEEE Intelligent Vehicles Symposium, pp. 215-220, Oct. 2000.

Huttenlocher, D.P., et al., "Comparing Images Using the Hausdorf Distance," IEEE Transactions on Pattern Analysis and machine Intelligence, vol. 15, No. 9, pp. 850-863, Sep. 1993.

Srinivasa, N., et al, "Fuzzy Edge Symmetry Features for Enhanced Intruder Detection," IEEE International Conference on Fuzzy Systems, vol. 2, pp. 920-925, St. Luis, MO, May 2003.

Freeman, W.T., et al., "The design and use of steerable filters," IEEE Transactions on Pattern Analysis and Machine Intelligence, vol. 13, No. 9, pp. 891-906.

Rao, R.N., et al., "An active vision architecture based on Iconic Representations," Artificial Intelligence, vol. 78, pp. 461-505, 1995.

Schmid and R. Mohr, "Local grayvalue invariants for image retrieval," IEEE Transactions on Pattern Analysis and Machine Intelligence, pp. 530-535, vol. 19, No. 5, May 1997.

Healey, G., et al., Global color constancy: recognition of objects by use of illumination—invariant properties of color distributions, vol. 11, No. 11, pp. 3003-3010, Nov. 1994.

Ohta, Y.I., et al., "Color information for region segmentation," Computer Graphics and Image Processing, vol. 13, pp. 222-241, 1980.

Kanerva, P., "Sparse Distributed memory," MIT Press 1988.

Rao, R.P.N. and Fuentes, O., "Learning navigational behaviors using a predictive sparse distributed memory," Proc. Of the 4th International conference on Simulation of Adaptive Behavior, MIT Press, 1996.

Nowlan, S.J., Maximum likelihood competitive learning, Advances in Neural Information Processing Systems 2, pp. 574-582, Morgan Kaufmann, 1990.

Bugmann, G., et al., "Instruction-based learning for mobile robots," Proceedings ACDM 2002.

Notice of Allowance for U.S. Appl. No. 11/051,747.

Torrance, M.C., "Natural Communication with Robots," Master's thesis, MIT, Department of Electrical Engineering and Computer Science, Cambridge, MA, 1994.

* cited by examiner

Local Object Blackboard

| Feature / Track | Type | Color | Proximity | Size | Direction of Travel | Lat, Lon |
|---|---|---|---|---|---|---|
| 1 | truck | white | 12 meters | *** | *** | *** |
| 2 | | | | | | |
| 3 | | | | | | |
| ... | | | | | | |
| n | | | | | | |

FIG. 4

SYSTEM AND METHOD FOR USING CONTEXT IN NAVIGATION DIALOG

PRIORITY CLAIM

The present invention is a Continuation-in-Part application, claiming the benefit of priority of U.S. patent application Ser. No. 11/051,747, filed on Feb. 3, 2005 now U.S. Pat. No. 7,379,870, entitled, "Contextual Filtering."

BACKGROUND OF THE INVENTION (1) Field of the Invention

The present invention relates to a combined dialog and vision navigation system, and more particularly to a navigation system capable of identifying salient features of the local environment and using them as semantic content within the dialog to assist a user in navigating.

(2) Description of Related Art

While driving an automobile, people make constant reference to the local environment in their speech. This is especially true during navigation tasks. For example, consider the following real exchange between a driver and a human navigator.

<driver> "Where am I going now?"

<navigator> "About another three blocks, you'll see it up on the left side, it's a plain brown building, its got a big red sign that says Savinar and Company Luggage."

<navigator> "In fact here, this is it, take a left. Not here, sorry, up where that white truck is taking a left."

In previous open dialog systems, a driver is unable to make reference to local objects. However, in navigation tasks between a driver and a human navigator, a large percentage of verbal interactions involve references to local objects from the perspective of the speaker (called deixis) with words like "that," "this," or "there." Thus, what is needed is a navigational system which allows references to be made to local objects.

In previous in-vehicle dialog systems, dialog construction is not as natural as if the driver were talking with a passenger. As a result, the driver must pay more attention while interfacing with the in-vehicle dialog system, which decreases the attention the driver can give to external events such as pedestrians, dense traffic, or other moving objects. In present systems, the user has to respond to the navigation system in a particular way that is necessary for the system to work. What is needed is an open dialog system that allows visible references, which makes it much easier to communicate and requires less cognitive attention.

Commercial navigation systems enable a user to follow visual directions on a map or receive verbal directions from the system (via synthesized speech). Such commercially available navigation systems include the Garmin StreetPilot®, NavMan Tracker, Magellan® 750Nav, Autodesk® LocationLogic. Garmin StreetPilot® is produced by Garmin International, Inc., located at 1200 East 151st Street, Olathe, Kans. 66062-3426. The NavMan Tracker is produced by Navman Europe Ltd., located at 4G Gatwick House, Peeks Brook Lane, Horley, Surrey, RH6 9ST, United Kingdom. The Magellan® 750Nav is produced by Thales Navigation Inc., located at 960 Overland Court, San Dimas, Calif. 91773. Autodesk® LocationLogic is produced by Autodesk, Inc., located at 111 McInnis Parkway, San Rafael, Calif. 94903.

Most systems use static Navteq digital maps, produced by Navteq. Navteq is located at 222 Merchandise Mart, Suite 900, Chicago, Ill. 60654. Further, commercial navigation systems support turn-by-turn directions cued from global positioning system (GPS) information, sometimes with additional cues from wheel sensors and other on-board sensors that increase position accuracy; however, they do not support references to objects in the local vicinity of the vehicle, either static or dynamic.

Autodesk® Location Services and TargaSys, a division of Fiat Auto, are marketing the Autodesk® LocationLogic platform as a telematics solution. Fiat Auto is located in Turin, Italy. Among other services (e.g., real-time weather and traffic information), Fiat Auto offers a "Follow Me" navigation service to get a user to their destination efficiently. However, this service cannot make reference to local features of the environment that are changing or not represented in their static maps since it has no vision capability and no corresponding dialog model.

IBM researchers have developed an automatic in-car dialog system that carries on a conversation with the driver on various topics to keep the driver awake (an artificial passenger). IBM Corporation is located at 1133 Westchester Avenue, White Plains, N.Y. 10604. The system developed by IBM is disclosed in U.S. Pat. No. 6,236,968. The system analyzes the driver's answers together with his or her voice patterns to determine if the driver is alert while driving. The system warns the driver or changes the topic of conversation if it determines that the driver is about to fall asleep. Such a system can be used for voice-activated operation of audio equipment, such as in-car CD/DVD players, radios, and telephones, but cannot refer to anything in the local vicinity of the vehicle.

Robotics researchers have developed systems that attempt to learn from a human teacher through the use of dialog. Bugmann et al., in "Instruction-based learning for mobile robots," Proceedings Adaptive Computing in Design and Manufacture (ACDM) 2002, describes the design of a practical system that uses unconstrained speech to teach a vision-based robot how to navigate in a miniature town. It allows the human controller to state commands to the robot, such as "Take the second right." The robot's environment is a static-tabletop, simulated-world that it perceives as a single image at-a-time. Such vision-based navigation only operates in the model environment. In other words, Bugmann et al. describe methods for extracting "action chunks" from the dialog, and converting those into forms to which the robot can respond.

Project VITRA (Visual Translator) researched the relationship between natural language and vision, including answering questions about observations in traffic scenes on a three-dimensional (3D) model of a town. Project VITRA was disclosed in Schirra et al., "From Image Sequences to Natural Language: A First Step Towards Automatic Perception and Description of Motions," Applied Artificial Intelligence, 1, 287-305 (1987). Also as part of VITRA, Maab et al., in "Visual Grounding of Route Descriptions in Dynamic Environments" in Proceedings of the AAAI Fall Symposium on Computational Models for Integrating Language and Vision, Cambridge, Mass., 1995, describe a computational model for an agent that can give incremental route descriptions.

Laengle et al., in "KANTRA—A Natural Language Interface for Intelligent Robots," published in the Proceedings of the 4th International Conference on Intelligent Autonomous Systems, in March 1995, describe a robot with a manipulator arm and vision camera that can be controlled using dialog to make references to objects on a table based on visual input. Objects are described in terms of their location and orientation.

U.S. Pat. No. 4,638,445, entitled, "Autonomous Mobile Robot," describes a system with near and far ultrasonic object sensing. Behavior of the robot can be controlled via a limited set of typed commands from a human operator. The invention does not address spoken human-computer dialog, navigation, external object references, precise sensing of object characteristics, and associated dialog modeling.

U.S. Pat. No. 5,870,701, entitled, "Control Signal Processing Method and Apparatus Having Natural Language Interfacing Capabilities," describes a signal processing method and apparatus to enable use of simple command-based language to control a switching system. The vocabulary for this system is limited to a small (approximately 100) word vocabulary with combinations of words for different control means. Related patents for similar command-language control of systems and databases are numerous (such as U.S. Pat. Nos. 6,035,267; 5,377,103; 5,321,608; 5,197,005; and 5,115,390) and typically use text-based input.

U.S. Pat. No. 5,748,974, entitled, "Multimodal Natural Language for Cross-Application Tasks," describes a method to combine natural language (spoken, typed, or handwritten) by any standard means from an application the user is running (the current application) to perform a task in another application (the auxiliary application) without leaving the current application. Similar database retrieval systems include U.S. Pat. No. 5,442,780.

U.S. Pat. No. 5,721,845, entitled, "Topically Organized Interface with Realistic Dialogue," describes a method and apparatus for formulating and responding to an inquiry through an interface which is topically organized. The dialogue system interface is comprised of various topical objects wherein each domain object has a set of object values. Selection of a desired object value of a domain object yields a set of potential inquiries, corresponding to the selected value, for selection. A selected inquiry is transmitted to an underlying system for formulation of a response. The formulated response of the underlying system is then transmitted to the user through the dialogue system interface. The dialogue system generates and displays further domain objects, object values, and inquiries that are logically anticipated from the selected inquiry.

U.S. Pat. No. 6,604,022, entitled, "Robot for Autonomous Operation," describes a robot which incorporates a body, arms with a hand grip, legs, several sensors, light elements, an audio system, and a video system. The sensors allow the robot to interact with objects in the room, and prevent the robot from traveling off an edge or bumping into obstacles. The light elements allow the robot to express moods. The audio system allows the robot to detect and transmit sounds. The video system allows a user to remotely view the area in front of the robot.

Additionally, the robot may operate in a plurality of modes, including modes that allow the robot to operate autonomously. The robot may operate autonomously in an automatic mode, a security mode, a greet mode, and a monitor mode. Further, the robot is manipulated remotely.

U.S. Pat. No. 6,539,284, entitled, "Socially Interactive Autonomous Robot," describes a robotic system that can accept an input from a human, select dynamic content from a database wherein the dynamic content is responsive to the input, and present the human with a response corresponding to the dynamic content selection. This system does not enable a dialog between the human and the robot, only a command language (preferably in the form of a menu-based touch screen). "Dynamic content" consists of data such as weather, news, entertainment, etc., obtained from a database, and thus is not of the form that can be used to reference moving objects.

U.S. Pat. No. 6,584,377, entitled, "Legged Robot and Method for Teaching Motions thereof," describes a legged robot that can learn a series of expressive motions by recognizing and language. The robot presses instructions from a user in the form of voice-input, and extracts and combines at least one basic motion in a time series.

U.S. Pat. No. 6,556,892, entitled, "Control Device and Control Method for Robot," describes a system for scheduling a robot's behaviors. Such behaviors include, among other capabilities, the ability for a user to issue a command, and a dialog management unit for supervising the dialog with the user based on the user input command. This is not an open dialog interaction and the robot does not have the ability to sense specific objects and refer to them in the dialog.

U.S. Pat. No. 6,122,593, entitled, "Method and System for Providing a Preview of a Route Calculated with a Navigation System," describes the NAVTEQ® system capability for referencing elements of a geographic database, such as roads. Other NAVTEQ® patents, such as U.S. Pat. No. 6,438,561, include the ability to use real-time traffic information in a navigation system. However, none of these describe the capability to reference moving objects in the near vicinity of the vehicle for navigation purposes.

U.S. Pat. No. 6,427,119, entitled, "Method and System for Providing Multiple Entry Points to a Vehicle Navigation Route," relates to a method and system for providing multiple beginning instructions for navigating a vehicle from a route generator. It does not contemplate the use of a dialog in conjunction with the navigation route planning, or references to local objects. Other NAVTEQ® patents include U.S. Pat. Nos. 6,047,280; 6,122,593; and 6,173,277.

U.S. Pat. No. 6,424,912, entitled, "Method for Providing Vehicle Navigation Instructions," describes a system using a database of road segments and a vehicle tracked with GPS. As the vehicle moves, the database is accessed for roads in the vicinity of the vehicle where a maneuver may be required.

U.S. Pat. No. 6,184,823, entitled, "Geographic Database Architecture for Representation of Named Intersections and Complex Intersections and Methods for Formation thereof and Use in a Navigation Application Program," describes using named intersections. The intersections facilitate certain functions for an end-user of the navigation application program and enhance performance of the navigation system. The invention does not contemplate the use of dynamically tracked objects such as pedestrians and vehicles in a navigation dialog with the driver.

U.S. Pat. No. 5,177,685, entitled, "Automobile Navigation System using Real Time Spoken Driving Instructions," describes an automobile navigation system that provides spoken instructions to guide a driver along a route. A map database, route finding algorithms, a vehicle location system, discourse generating programs, and speech generating programs are described. Based on the current position of an automobile and its route, the discourse-generating programs compose driving instructions and other messages in real-time and then speech is generated for the driver.

U.S. Pat. No. 6,498,985, entitled, "Method for Multimedia Supported Navigation and Navigational Device," describes a device for providing driving directions. The device refers to prominent objects along the travel route, using everyday language and is supported by an optical readout. The prominent objects include only those objects that are known in advance (e.g., landmarks, monuments) and stored in the system database. Similar patents include U.S. Pat. No. 6,477,460.

Other similar patents are related to the use of a voice output to provide navigation directions to a driver. Examples of such patents include U.S. Pat. Nos. 6,587,786; 6,526,351; 6,351,698; 6,292,743; 5,736,941; and 5,406,492. However, these systems only provide references to stationary objects that are in a database and that are known in advance. Additionally, the driver cannot reference moving or stationary objects that are not already contained in the database.

Other patents relate to vehicle guidance systems that use specialized off-vehicle infrastructure, such as in an intersection. Examples of such patents include U.S. Pat. Nos. 5,126,941, and 4,907,159. These systems can track multiple vehicles in a restricted zone, such as an intersection, but do not enable the driver or system to reference these objects.

Thus, what is needed is a system and method for using visual context in navigation dialog, where the navigation system can interpret and respond to local environmental conditions. Further, what is needed is a navigation system that enables the driver of a vehicle engaged in dialog with an automated navigation system to make reference to objects in the local vicinity of the vehicle. Such objects should include those that are moving, such as pedestrians and other vehicles, and those that are salient but not recorded in a database.

BRIEF SUMMARY OF THE INVENTION

The present invention provides a system and a method that overcomes the aforementioned limitations and fills the aforementioned needs by providing a system and method for using visual context in navigation dialog. Thus, the present invention is a navigation system that comprises a route planning module and a route guidance module. The route planning module is configured to receive a request from a user for guidance to a particular destination, and based on a starting point, determining a route from the starting point to the particular destination. The route guidance module is configured to receive the route from the route planning module, and based on the route and current location of the user, provide location-specific instructions to the user. The location-specific instructions include reference to specific visible objects within the vicinity of the user.

In another aspect, a speech understanding system is included for receiving an input speech utterance from a user and converting the input speech utterance into an interpreted input utterance. The interpreted input utterance consists of a semantically labeled phrase.

In yet another aspect, the route planning module further comprises a route planning dialog manager. The route planning dialog manager is configured to receive an interpreted input utterance from the speech understanding system requesting guidance to a particular destination. Based on the starting point, the input utterance, and the particular destination, the route planning dialog manager generates a starting and stopping point on the user's route, and once generated, confirms with the user that the generated starting and stopping points are correct starting and stopping points.

In another aspect, the route planning module further comprises a navigation route server. The navigation route server is configured to receive the starting and stopping points, and based on the starting and stopping points, generate a route with directional instructions from the starting point to the stopping point.

In yet another aspect, the route guidance module further comprises a vehicle position and heading module. The vehicle position and heading module is configured to determine a specific location of the navigation system.

The route guidance module further comprises a vision module. The vision module is configured to receive a plurality of image frames and detect and track objects proximate to the navigation system that are represented in the image frames, such that each object is assigned a track identifier and is then tracked in subsequent image frames.

In another aspect, the route guidance module further comprises a context monitor. The context monitor is configured to receive and combine information pertaining to the route, the specific location of the navigation system, and objects being detected and tracked that are proximate to the navigation system. Based on the combination of the information, the context monitor is configured to generate situational data. The situational data is a continuously updated status of the navigation system and its current local situation.

Additionally, the route guidance module further comprises a local object blackboard. The local object blackboard is configured to receive the track identifier and maintain a record of track identifiers that are currently proximate to the navigation system, otherwise delete the track identifiers.

In yet another aspect, the route guidance module further comprises a local reference matcher. The local reference matcher is configured to receive the track identifier, the specific location of the navigation system, and user specific instructions regarding objects proximate to the navigation system, and further configured to match the user specific instructions regarding objects proximate to the navigation system with a specific track identifier.

Furthermore, the route guidance module comprises a route guidance dialog manager. The route guidance dialog manager is configured to receive a combination of information consisting of an interpreted input utterance from the speech understanding system, the route, and the situational data. Based on the combination of information, the route guidance dialog manager generates a phrase selected from a group consisting of the phrase being generated in response to a reference to a specific visible object within the vicinity of the user, and the phrase including a reference to a specific visible object within the vicinity of the user.

In another aspect, the navigation system further comprises a speech generator. The speech generator is configured to receive the phrase from the route guidance dialog manager and convert the phrase into an audible, speech signal.

In yet another aspect, the navigation system further comprises an automobile with the route planning module, route guidance module, speech understanding system, and speech generator affixed thereto, thereby creating a driver navigation system.

As can be appreciated by one skilled in the art, the present invention also includes a method for forming and using the navigation system herein. The method comprises a plurality of acts to configure the system as described above.

Finally, the present invention also comprises a computer program product. The computer program product comprises computer-readable instruction means stored on a computer-readable medium that are executable by a computer for causing the computer to perform the operations described herein. The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

BRIEF DESCRIPTION OF THE DRAWINGS

The objects, features and advantages of the present invention will be apparent from the following detailed descriptions of the preferred aspects of the invention in conjunction with reference to the following drawings, where:

FIG. 4 is an illustration of a local object blackboard according to the present invention.

DETAILED DESCRIPTION

Figure 1:
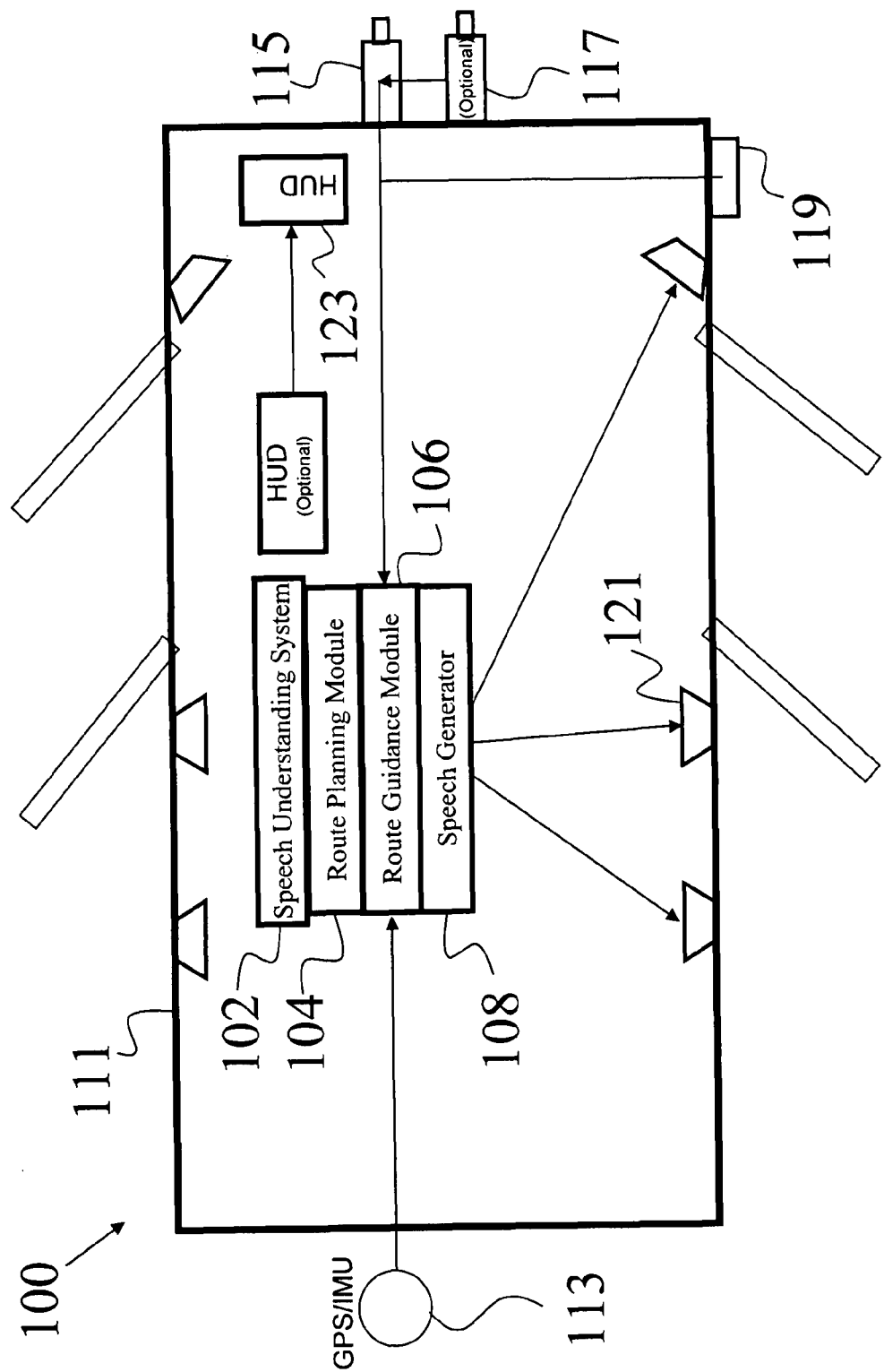
FIG. 1 is an illustration of a system for using discourse and visual context in navigation dialog, as incorporated into vehicle.

The present invention relates to a combined dialog and vision navigation system for using spoken language capable of identifying salient features of the local environment of the vehicle and using them as semantic content within the dialog. Specifically, the present invention links verbal references of dynamically moving local objects to the locations of specific environment features. Further, the present invention enables modulation of the system speech in a dialog based on dynamic, local-vehicle context to enhance situational awareness and minimize distractions to the driver. The following description, taken in conjunction with the referenced drawings, is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein. Furthermore it should be noted that, unless explicitly stated otherwise, the figures included herein are illustrated diagrammatically and without any specific scale, as they are provided as qualitative illustrations of the concept of the present invention.

One skilled in the art will appreciate that the scope of the terms is intended to be construed with reference to this disclosure as a whole and with respect to the claims below. In order to provide a working frame of reference, a brief introduction is provided in the form of a narrative description of the present invention to give a conceptual understanding prior to developing the specific details. The introduction is followed by a detailed description of the elements is provided in order to enable the reader to make and use the various embodiments of the invention without involving extensive experimentation.

(1) INTRODUCTION

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar Features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step" of in the claims herein is not intended to invoke the provisions of 35 U.S.C. Section 112, Paragraph 6.

(2) SYSTEM OVERVIEW

The present invention allows a two-way dialog between a driver and an automated navigation dialog system about objects in the vicinity of the vehicle, including moving objects. That is, either the driver or the navigation dialog system may reference local objects. For example, the driver may reference local objects while inquiring about directions, while the navigation dialog system may reference local objects while providing the directions. Pervious systems have not provided this capability largely because they cannot sense objects in the vicinity of the vehicle. In addition, the prior art does not contemplate the use of local context to modulate the dialog and minimize distraction to the driver.

FIG. 1 depicts the architecture of the vehicle system 100. The system 100 is comprised of a speech understanding system 102, a route planning module 104, a route guidance module 106, and a speech generator 108. The speech understanding system 102 is configured to receive an input speech utterance from a user and convert the input speech utterance into an interpreted input utterance (consisting of a semantically labeled phrase). The route planning module 104 is configured to receive a request from a user for guidance to a particular destination and, based on a starting point, determining a route from the starting point to the particular destination. The route guidance module 106 is configured to receive the route from the route planning module 104 and, based on the route and current location of the user, provide location-specific instructions to the user. The location-specific instructions are formatted as a phrase and include reference to specific visible objects within the vicinity of the user. The speech generator 108 is configured to receive the phrase from the route guidance module 106 and convert the phrase into an audible speech signal. Incorporated into an Automobile 111, the above modules, system, and generator collectively create a driver navigation system.

One skilled in the art will appreciate that the speech understanding system 102, the route planning module 104, the route guidance module 106, and the speech generator 108 may be contained in a single computer processing unit (CPU) and run as separate processes or be distributed across multiple CPUs connected via an in-vehicle network. Due to performance demands of the system, it may be desirable to use separate CPUs to implement the above systems.

The route guidance module 106 uses a position determination system 113 to determine the location of the user. As described in further detail below, the route planning module 104 uses the location to prepare a route for the user. One skilled in the art will also appreciate that the position determination system 113 may comprise a global positioning system (GPS)/Inertial Measurement Unit (IMU) or a suite of GPS and vehicle-centric sensors capable of providing position and vehicle heading data.

A vision device 115 is used to provide visual information to the route guidance module 106. As a non-limiting example, the vision device 115 includes a video camera capable of providing color video input for extraction of local objects of interest. Optionally, an additional vision device 117, i.e. a second video camera, may provide video for stereo depth processing. Further, additional sensors 119, such as wheel sensors and accelerometers, may be added to improve position tracking and data accuracy. As a non-limiting example, data from the additional sensors 119 may include typical vehicle computers which provide information such as vehicle speed and status of driver controls.

To provide the user with navigational dialog, speakers 121 and an optional heads-up display (HUD) 123 are included. The speakers 121 are provided for audio playback. The optional HUD 123 may provide visual cues that correspond to dialog references, including iconic images (e.g., arrows indicating the direction of an upcoming turn) as well as short text strings (e.g., street or business names).

Figure 2:
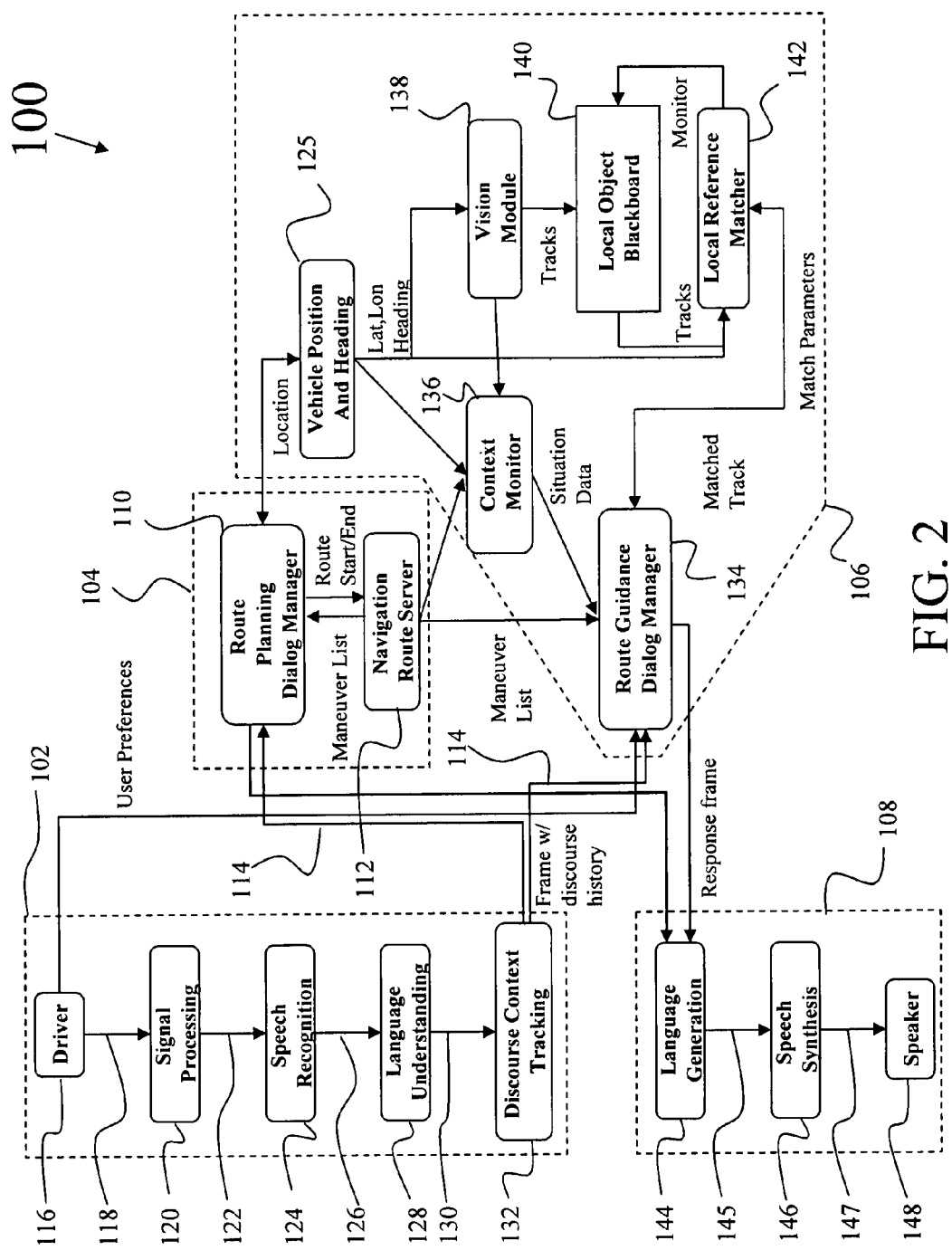
FIG. 2 is a schematic of the system for using discourse and visual context in navigation dialog according to the present invention.

FIG. 2 depicts a detailed functional diagram for the system 100. As shown in FIG. 2, the system 100 is broken down into four different sub-systems, one for receiving a speech utterance and generating a parsed and interpreted phrase (i.e., speech understanding system 102), one for route guidance (i.e., route guidance module 106), one for route planning and destination entry (i.e., route planning module 104), and one for audibilizing (via synthetic speech) the planned route or directions (i.e., speech generator 108). For clarity, each of the four sub-systems will be described in turn. Additionally, descriptions of user preferences and exemplary operations are also provided.

(2.1) Speech Understanding System

The speech understanding system 102 is any suitable system that is capable of receiving an input speech utterance from a user and converting the input speech utterance into an interpreted input utterance (a semantically labeled phrase). Such a speech understanding system was described in U.S. patent application Ser. No. 11/051,747, entitled, "Contextual Filtering," which is incorporated herein by reference as though fully set forth herein.

In short, the speech understanding system 102 receives an input utterance from a user (i.e., driver) 116. The utterance is converted to an analog signal 118, which is then processed by signal processing 120 to generate acoustic feature labels 122. Speech recognition 124 software is then used to (a) identify the most likely phones, given the sequence of extracted features, and/or (b) identify the most likely words, given the sequence of phones. The speech recognizer will pass one of the following items 126 to the language understanding program 128: an n-best list of possible phrases; a word lattice; or a single phrase (the top item off the n-best list). A language understanding program 128 is thereafter used to generate a semantic frame 130.

Discourse context tracking 132 is then used to generate the fully interpreted input utterance 114, a semantically and pragmatically labeled phrase whose links into the surrounding dialog context (via, e.g. pronouns) is explicitly indicated. An example of such a program is IBM's ViaVoice. IBM Corporation is located at 1 New Orchard Road, Armonk, N.Y. 10504-1722, United States of America. Commercial off-the-shelf (COTS) products may be used for the speech understanding system, provided that they allow access to the n-best list (through the word lattice)

The fully interpreted input utterance 114 is then passed along to the route planning module 104 and/or the route guidance module 106.

(2.2) Route Planning Module

The route planning module 104 uses real-time context such as current location, discourse history, and geographic and map knowledge to constrain search activities and to disambiguate input from the driver so that the desired destination can be identified efficiently and a route planned. These functions may optionally be enhanced by the addition of information from a vision module (described in further detail below). A non-limiting example of such information includes estimates of the number of lanes for the vehicle's current location, which enables improved matching of current position to the digital map.

The route planning module 104 includes two sub-systems, a route planning dialog manager 110 and a navigation route server 112.

(2.2.1) Route Planning Dialog Manager

The route planning dialog manager 110 is configured to receive an interpreted input utterance 114 from the speech understanding system 102 requesting guidance to a particular destination. Based on the starting point (e.g., location of the user), the input utterance, and the particular destination, the route planning dialog manager 110 generates a starting and stopping point on the user's route. Once the points are generated, the route planning dialog manager 110 confirms with the user that the starting and stopping points are accurate. For example, the route planning and dialog manager 110 receives the user's current position from a vehicle position and heading module 125 (described further below). Additionally, the route planning and dialog manager 110 receives the input utterance (such as "go to Home" or "go to <address or intersection>") and based on that, determines the stopping point (i.e., "Home"). The route planning and dialog manager 110 would then confirm the user's current location and that the destination is Disneyland.

(2.2.2) Navigation Route Server

The navigation route server 112 is configured to generate directional instructions from the starting point to the stopping point. The navigation route server 112 receives and uses the starting and stopping points to generate a route with directional instructions. The directional instructions operate as a maneuver list to instruct the user in a set of maneuvers required to reach the stopping point.

The navigation route server 112 is any suitable software, system, or device for generating directional instructions based on a starting and stopping point. Such systems typically operate as a map server and are commercially available, such as the navigational systems that can be found in many vehicles that are available on the market as of the date this application is filed, a non-limiting example of which includes Navteq.

(2.3) Route Guidance Module

The route guidance module 106 includes six sub-systems (or sub-modules). The six-subsystems include the vehicle position and heading system 125, the route guidance dialog manager 134, the context monitor 136, the vision module 138, the local object blackboard 140, and the local reference matcher 142.

(2.3.1) Vehicle Position and Heading System

The vehicle position and heading system 125 obtains the vehicle's position and heading using any suitable system for determining such information. For example, vehicle position and heading system 125 obtains the position and heading from commercially available systems that use inertial measurements and a global positioning system (GPS) to continuously track the vehicle. As a non-limiting example, the FLEXnav Proprioceptive Position Estimation (PPE) System can be used. The FLEXnav PPE system is produced by Applied Robotics Technologies, LLC, which is located at 5678 Lakeshore Drive, Ann Arbor, Mich. 48108.

(2.3.2) Route Guidance Dialog Manger (Route Guider)

The route guidance dialog manager (hereinafter referred to as the "route guider") 134 is one component of the present invention. The route guider 134 is configured to receive a combination of information consisting of an interpreted input utterance from the speech understanding system 102, the route from the navigation route server 112, and situational data from the context monitor 136. Based on the combination of information, the route guider 134 generates an applicable phrase. For example, the route guider 134 can generate a phrase in response to a statement or question from the user, such as in response to a user's verbal reference to a specific visible object within the vicinity of the user. Alternatively, the phrase can be generated by the system 100 referring to a specific visible object within the vicinity of the user.

One skilled in the art will appreciate that there are many ways in which the route guider 134 may be implemented, including (1) via semi-structured, stage-wise constrained dialog using directed dialog methods, or (2) via unstructured, topic-domain constrained open dialog methods. One skilled in the art will also appreciate that deciding which style of dialog to use is empirical, and is based on a number of factors, including the size of the grammar and language model, the natural structure of in-domain dialog, perplexity of the domain, and use-environment impact on speech recognition performance. In either of these approaches, statistical language models are created that represent the expected distribution of user utterances during actual use.

The main function of the route guider 134 is to manage the spoken exchange between the system and the user so that appropriate functions can be performed by the system. In one aspect, the system 100 supports mixed initiative (either the system or the user can initiate a dialog), barge-in (the user can interrupt the system), and mode-less data entry (the user can provide information needed by the system in any order). The system 100 utilizes a semantic frame schema to capture incoming information and maintain discourse history. The semantic frames in the discourse history database may be populated automatically by the route guider 134 by querying other sub-systems or databases, or through input from the driver, either spoken or through non-speech controls, or a combination of both. The route guider 134 monitors the status of the semantic frame (or frames) as a dialog is conducted to determine if enough information has been provided by the user and/or accessed from other sub-systems to carry out the desired action, and if so, initiates execution of the desired action. If more information is needed, the route guider 134 determines what information is missing and queries the user for appropriate additional input. At any given moment in the dialog, missing information may result from simple form-filling actions, ambiguity in user input, errors (user or system), or changing context as represented by other sub-systems. In carrying out dialog with the user to populate the semantic frame (or frames), the route guider 134 utilizes numerous heuristics to adapt system utterances based on a variety of context information. The system 100 adaptively relaxes or tightens constraints on the language model (by raising or lowering the minimum thresholds for accuracy) and backend database searches based on discourse history and context knowledge as represented in the other sub-systems.

There are certain configurations of roadways that are more likely to result in confusions and wrong turns than others. For example, multiple turn opportunities within the window of "here" references. The worst of these is probably a large street with a traffic light acting as a distracter, either just before or just after the target roadway. A similar problem arises where a larger street is the target, but a smaller street, alley, or parking-lot entrance comes just before the target roadway. A third similar problem is where both roadways are of equivalent salience, but both/all are within the "here" window. Other possibilities include traffic circles and non-perpendicular intersections. Not all of these will be included in the route guider 134 database, so the vision module 138 is used to determine when a confusing configuration is present.

(2.3.3) Context Monitor

The context monitor 136 is another component of the system 100. The context monitor 136 monitors world knowledge from all the sub-systems and relates that knowledge to a vehicle-centric framework so that local context is maintained continuously. In other words, the context monitor 136 receives and combines information pertaining to the route, the specific location of the navigation system, and objects being detected and tracked that are proximate to the navigation system. Based on the combination of the information, the context monitor 136 generates situational data that is a continuously updated status (e.g., picture or journal) of the navigation system and its current local situation.

The context monitor 136 utilizes rule-based reasoning and heuristics (or probabilistic and fuzzy matching) to interpret sub-system status, predict key conditions, and maintain context history to maintain a variety of metrics. Non-limiting examples of such metrics include:

(1) Traffic congestion: The context monitor 136 utilizes vehicle status (e.g., speed profile), information from the vision module 138 (e.g., near-by vehicle counts), and map data (e.g., speed limit, speed control device information) to infer the level of traffic congestion relative to nominal expectations for traffic flow on the route segment being traversed.

(2) Lane position: The context monitor 136 utilizes the vision module 138 (e.g., near-by vehicle lateral positions and trajectories, road features, etc.) and map data (e.g., lane count and road type) to infer which lane the vehicle is currently traveling in.

(3) Traffic density: The context monitor 136 utilizes its own archive (e.g., speed, route traversal, lane estimation, traffic congestion histories) to infer the density of traffic and predict maneuverability metrics (e.g., estimated time to change lanes).

(4) Maneuver status: The context monitor 136 maintains a model of the route being traversed, including such information as maneuver types, road layouts, estimated decision points modulated by traffic density and congestion factors, etc. Comparison of current conditions with the route model enables the context monitor 136 to infer issues with upcoming maneuvers and cue the other sub-systems appropriately.

By abstracting key metrics based on a combination of inputs from all sub-systems, the context monitor 136 maintains an ongoing picture of the situation. This situational awareness will be utilized in turn by the sub-systems to refine their processes for enhanced performance. The route guider 134, for example, utilizes the traffic congestion data, lane position, and traffic density to determine the urgency of obtaining or giving input. Upcoming maneuver guidance becomes more urgent in complex and hurried conditions. For example, the maneuver guidance is more urgent if current travel is in the left lane of six lanes under dense traffic conditions, and the upcoming maneuver is to the right. The system adapts guidance type and timing to the circumstances.

Further, by maintaining a continuous history of vehicle-centric context information, the context monitor 136 supports the creation of summary statistics that can then be transmitted to a central collection point, for aggregation with data from other vehicles. The present invention supports aggregation of data by route segments and lanes at an unprecedented level of detail. A non-limiting example of such a central collection point includes an OnStar® service center. OnStar® is produced by OnStar Corp., located at 400 Renaissance Center, Detroit, Mich. 48265.

(2.3.4) Vision Module

The vision module 138 is another component of the system 100. The vision module 138 detects and tracks objects surrounding the vehicle. In particular, the vision module 138 provides the ability to detect and track pedestrians, vehicles, and landmarks. The inputs to the vision module 138 are image(s) from a camera(s) (e.g., elements 115 and 117 from FIG. 1) and the output from the vision module 138 is the label, position, dominant color and track number for each detected object in the scene.

The problem of detecting and recognizing objects in images is a well-studied research topic. The work in the area can be broadly classified into two types: recognition based on motion cues and recognition based on shape cues. The disclosed vision module 138 adopts a hybrid approach to object detection that uses color and motion information (i.e., Dubuisson, as described below) to first extract objects from the scene and then apply a multi-scale edge feature extraction module based on Haar wavelets and fuzzy symmetric measures of edges (i.e., U.S. patent application Ser. No. 10/329, 319, and Srinivasa 2003) to recognize the extracted objects. Dubuisson is an article by M. Dubuisson and A. Jain, entitled, "Contour Extraction of Moving Objects in Complex Outdoor Scenes," in the International Journal of Computer Vision, 1995, vol. 14, pp. 83-105. Srinivasa 2003 is an article by N. Srinivasa, S. Medasani, Y. Owechko & D. Khosla, entitled, "Fuzzy Edge Symmetry Features for Enhanced Intruder Detection," in IEEE International Conference on Fuzzy Systems, 2003, vol. 2, pp. 920-925. Dubuisson, U.S. patent application Ser. No. 10/329,319, and Srinivasa 2003 are incorporated herein by reference as though fully set forth herein. To recognize landmarks, the detection ability of the system is enhanced by extracting point features based on local feature descriptors within the extracted object. Such techniques were described by Freeman 1991, Rao 1995, Schmid 1997, and Healy 1994. Freeman 1991 is an article by W. T. Freeman and E. H. Adelson, entitled, "The design and use of steerable filters," in IEEE Transactions on Pattern Analysis and Machine Intelligence, vol. 13, no. 9, pp. 891-906. Rao 1995 is an article by R. N. Rao and D. H. Ballard, entitled, "An Active Vision Architecture based on Iconic Representations," in Artificial Intelligence, vol. 78, pp. 461-505. Schmid 1997 is an article by Schmid and R. Mohr, entitled, "Local grayvalue invariants for image retrieval," in IEEE Transactions on Pattern Analysis and Machine Intelligence, pp. 530-535, vol. 19, No. 5, May. Finally, Healy 1994 is an article by G. Healy and D. Slater, entitled, "Global Color Constancy: recognition of objects by use of illumination-invariant properties of color distributions," in vol. 11, no. 11, pp. 3003-3010, November. One skilled in the art will appreciate that alternative approaches are also possible.

Figure 3:
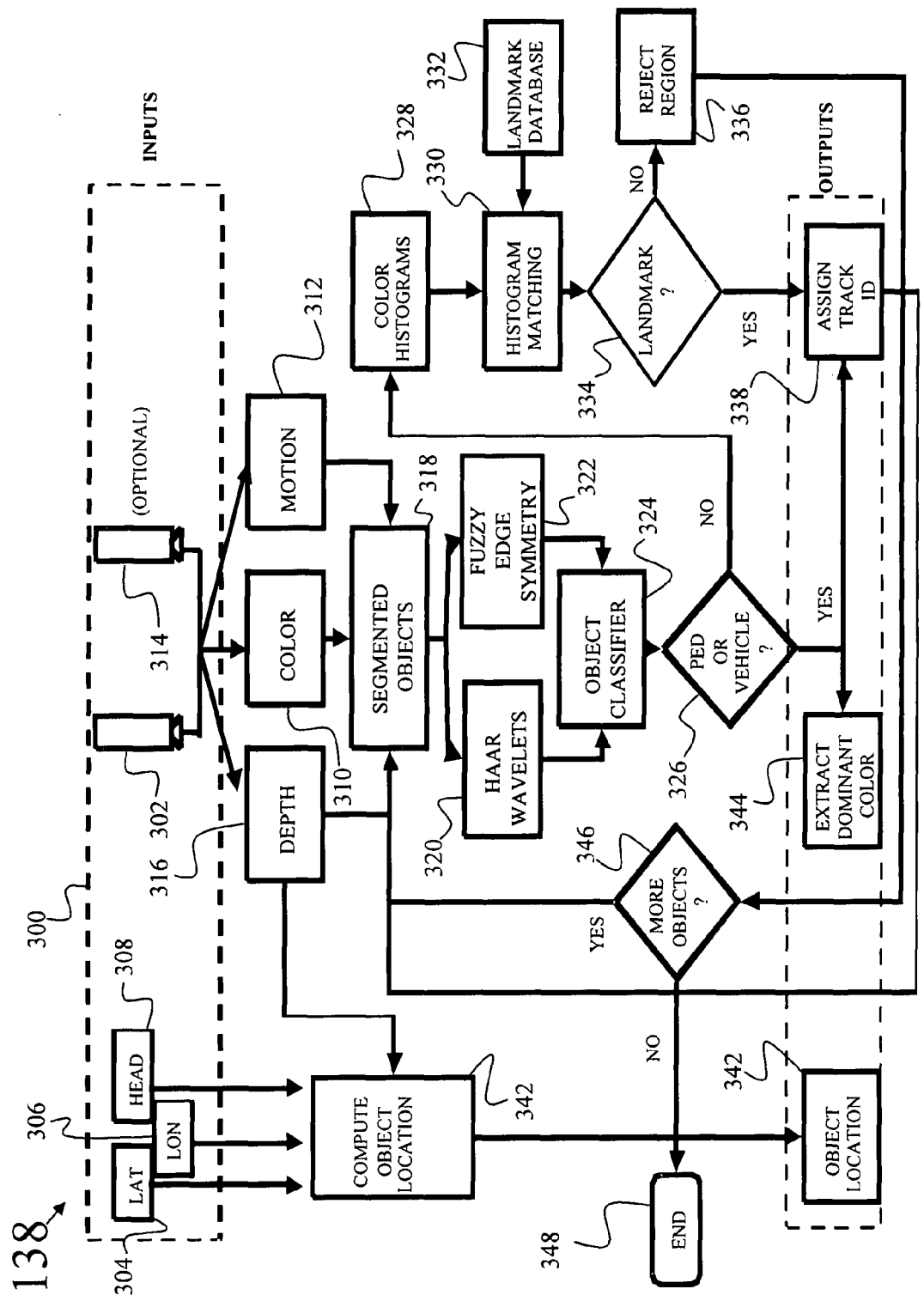
FIG. 3 is a schematic of a vision module and its architecture according to the present invention.

The architecture for the vision module 138 is shown in FIG. 3. The inputs 300 to the vision module 138 are color images of the scene in front of the vehicle (from at least one camera 302) as well as the latitude 304, longitude 306, and heading 308 of the vehicle. Using color in the image, color segmentation 310 is performed on the image to segment the various colors.

In parallel, motion segmentation 312 is performed on the image. Motion segmentation 312 is performed by using two frames and comparing the locations of various objects in the frames. For example, two consecutive still frames from a video image can be used to identify whether or not an object has moved in the scene (by changing its location between the two still frames).

If a second camera 314 is used, then depth estimation 316 is extracted for the scene. Depth estimation 316 is the process by which the depths of various objects found in the image are estimated, including the distance from the objects to the navigation system. Depth estimation 316 can also be used to estimate the sizes of the various objects in an image.

This approach combines the two (or three) outputs to obtain a final set of segmented objects 318. Thus, a robust segmentation is provided that overcomes bottlenecks with any individual segmentation approach. For each extracted object, a Haar wavelet 320 and fuzzy edge symmetry 322 features are extracted. Such features are extracted using any suitable technique for extracting Haar wavelets and fuzzy edge symmetries, a non-limiting example of which includes using the technique described in the Srinivasa 2003 article.

These features are then classified using a simple feedforward neural network that is already trained on example features of cars and pedestrians. The object classifier 324 provides a pedestrian or a car label 326 to the processed object if necessary. If the label is neither a car nor a pedestrian, then the object is further processed to extract color histograms 328. The color histograms 328 are extracted using any suitable technique for extracting histograms from an object in an image, a non-limiting example of which includes using a technique described by Healey 1994. The histograms 328 are then compared 330 to a landmark database 332 using color-distribution invariants. If a match exists, then the object is labeled as a landmark 334. If the segmentation does not have a label after these processing stages, the object is rejected, shown as a rejection region 336. For each labeled object, a track number (i.e., track identifier) is assigned 338 and then tracked in subsequent frames. Tracking is based on using the sum-of-square of intensity and object parameters such as object size and shape. If the system uses two cameras, then the depth information is combined with the latitude, longitude, and heading of the vehicle to compute 340 a location 342 for each tracked object. If not, the system estimates location using size of the extracted object as a cue since this changes in a predictable fashion for both pedestrians and vehicles and can hence provide a rough depth estimate. In addition to the label and location, a dominant color is extracted 344 for each object. This can be achieved by averaging the red (R), green (G), blue (B) values of the largest sub-region in size within the segmented object.

Finally, if there are more objects 346 in the image, then the process is repeated to provide a track number for each additional object. If there are no more objects, then the process ends 348.

(2.3.5) Local Object Blackboard

As shown in FIG. 2, the system 100 also includes a local object blackboard 140. The local object blackboard 140 is configured to receive the track identifier and maintain a record of track identifiers that are currently proximate to the navigation system. If the object is not proximate the navigation system, then the system deletes the track identifier that corresponds to that object. FIG. 4 is an illustration of a local object blackboard 140. As shown, the local object black board 140 maintains a list of objects and their features 400, including a track number 402 to track each object.

(2.3.6) Local Reference Matcher

The local reference matcher (matcher) 142 facilitates information matching between the route guider 134 and the vision module 138. A match by the matcher 142 indicates that there is confirmation for any user query from the visual module 138. The matcher 142 can also serve as an alerting mechanism for the route guider 134 when the outputs from the vision module 138 serve to prime the route guider 134 module. In that case, the route guider 134 could, in effect, generate its own query to the user, such as "would you like to access the traffic near you?" There are several ways in which this matching can be realized. For example, the matcher 142 can be modeled as an associative memory based on concepts of sparse distributed memory (SDM), as discussed in P. Kanerva, Sparse Distributed Memory, MIT Press (1988). In this framework, the major event descriptors produced by the route guider 134 form one side of the associative memory. For example, descriptors could include terms such as "near" referring to the neighborhood of the vehicle or "white" referring to the color of the vehicle. The other side to the associative memory will comprise of outputs produced by the vision module 138. For example, descriptors could include terms such as "R=255, B=255, G=255" that represent the R, B, G values of a white object. The system could be primed with prior knowledge about the typical descriptors that could be produced by the route guider 134 and the vision module 138.

The sparse distributed memory can be regarded as a generalized random-access memory (RAM), where the memory addresses and data come from high-dimensional vector spaces. As in conventional RAM, there exists an array of storage locations, each identified by a number (address of the location) with associated data being stored in these locations as binary words or real words. Such techniques were discussed in Rao and Fuentes, "Learning Navigational Behaviors Using a Predictive Sparse Distributed Memory," Proceedings of the 4th International Conference on Simulation of Adaptive Behavior, MIT Press. However, unlike conventional RAM that is usually concerned with addresses about 20 bits long (memory size=220 locations) and data words only about 32 bits long, SDM is designed to work with addresses and data vectors with much larger dimensions. Due to the astronomical size of the vector space spanned by the address vectors, it is physically impossible to build a memory containing every possible location of this space. However, it is also unnecessary since only a subset of locations will ever be used in any application. This provides the primary motivation for the sparse distributed models designed by Kanerva's model. Thus, only a subset of the address space is used for identifying data locations, and input addresses are not required to match stored addresses exactly, but only to lie within a specified distance (radius) from an address to activate that address.

Figure 5:
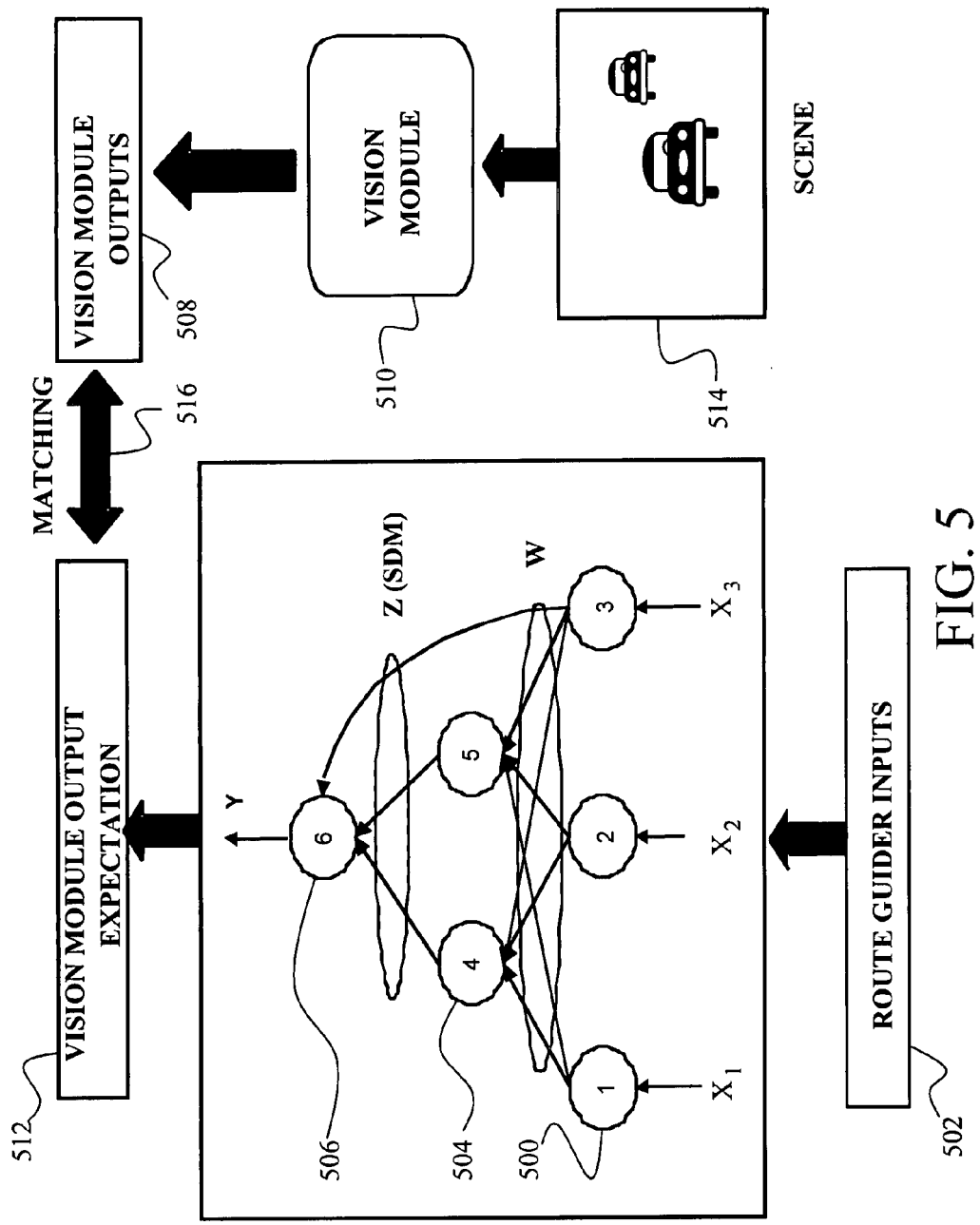
FIG. 5 is a schematic of the architecture for a sparse distributed memory according to the present invention.

One approach to solving the matcher's 142 task by SDM is outlined below. The SDM is formulated as a three-layer, fully connected feedforward network, as illustrated in FIG. 5. It is assumed that the memory has m storage locations. The first layer consists of n inputs 500 from the route guider 502. The hidden layer consists of m units 504 and the output layer consists of k units 506 corresponding to the outputs 508 from the vision module 510. The weights or connections between the input layer and the hidden unit i are represented by vector wi and the weights between the hidden units and the output unit j are represented by the vector zj. The algorithm begins by initializing the m unique address (of length n) at random for each memory location. This is akin to randomly initializing the weights wi. The system can then be trained by presenting training vectors from both the route guider and the corresponding vision module outputs 508 using the soft competitive learning rule, as disclosed in Nowlan, "Maximum Likelihood Competitive Learning," Advances in Neural Information Processing Systems 2, pp. 574-82, Morgan Kaufmann (1990). The training essentially adapts the weight vectors wi and zj such that given a route guider input 502, an appropriate vision module output expectation 512 can be learned. If the actual vision module outputs 508 are comparable to the expected vision module outputs 512, then the route guider expectation is confirmed. For example, if the route guider input 502 is "white" and the vision module 510 processes a given image frame 514 and one or more of the tracks corresponds to a white object, then the expectation of route guider is confirmed. The matching 516 for similarity between the route guider expectation (i.e., the vision module output expectation 512) and the actual vision module outputs 508 can be obtained using Euclidean distance. The advantage of using the SDM is robustness to noise inputs and outputs as well as scalability. For example, let m=100 represent the physical address locations available in a single memory. It can be shown that the memory capacity of the SDM is approximately 5% of m. If k=25, the distinct route guider expectations can occur for various objects detected per scene, where the number of potentially distinguishable objects is (0.05 m) k=525, which is an extremely large number and probably much larger than the number of objects that may be encountered by the system.

(2.4) User Preferences

Dialog in context supports the inclusion of user preferences (overlapping with preference settings for the navigation system in general). At one extreme, the system gives instructions at every potential maneuver point (e.g., a street intersection). This is known to be annoying to drivers, and is thus undesirable. At the other extreme, the system provides instructions only when asked for, and only gives instructions that include references to visible objects (or maneuver point distances) that were specifically asked for. In-between those two extreme examples are a multitude of intermediate settings. Non-limiting examples of such settings include:

(1) Providing instructions that include references to a visible object (where possible) for every point at which the driver must execute some maneuver (i.e., wherever the driver changes from one roadway to another).

(2) Providing instructions that include references to a visible object (where possible) only at maneuver points for which there is confusion potential above some threshold (e.g., those mentioned above).

(3) Providing instructions that include references to a visible object only when approaching a maneuver point, and the system determines there is potential (exceeding some threshold) to go off-route due to external factors (such as lane position, speed, lack of turn signal, etc.).

(4) Providing instructions that include references to a visible object only when approaching a maneuver point and the driver explicitly asks for such guidance, either by making reference to a specific instance of such an object (e.g., "is it up where the truck is turning?") or by asking for visible object/landmark help in the abstract (e.g., "is there a light at my next turn?").

(5) Providing instructions that include references to information that is provided via map databases (such as Navteq's map database).

Thus, the system is configured to accept a desired user preference setting and provide the user with relative dialog when appropriate.

(2.5) Example Operation

To illustrate operation of the system, consider an example scenario. First, the driver inputs a destination. The route planning dialog manager 110 (shown in FIG. 1) queries from the driver may be distinguished from the route guider 134 queries by virtue of either partitioning the Automatic Speech Recognition (ASR) and Natural Language Understanding (NLU) components into two distinct sub-systems which the user requests by name, or by virtue of automated domain-switching. Automated domain switching is a method by which the system can make a preliminary determination about the content of a user utterance, and then submit the utterance to the appropriate speech understanding components for that domain. It essentially automates the routing of a query to the appropriate subsystem instead of forcing the user to request the specific subsystems by name. The route planning dialog manager 110 generates a maneuver list (or more generally, a graph) and sends it to the route guider 134. The vision module 106 is initialized and begins placing vehicle, pedestrian, and landmark tracks and features on the local object blackboard 140. Each object will have a unique identifier associated with it in case there is more than one object with the same features (e.g., three white cars). Sometime later, the driver asks, "Do I turn here?" The spoken input is parsed, and the route guider 134 determines the driver has requested information about currently visible features of the situation (by virtue of use of term "here"). The route guider 134 initializes the local reference matcher (matcher) 142 to search until timeout (next turn on the maneuver list) and keeps a marker for objects which are referred to, until the object is gone or until timeout. The system will keep a distinct record of multiple instances of a certain type of object. The matcher 142 continually checks the local object blackboard 140 for tracked objects and attempts to match tracks to the next turn. If the matcher 142 finds a match during the time window, it sends a track description to the route guider 134, which passes a response frame to the speech generator 108. The speech generator 108 includes a language generation module 144 that converts the response frame to a well-formed sentence (i.e., text) 145. The speech generator 108 passes the text to a speech synthesis module 146 which generates an analog signal 147 that is sent to a speaker 148. The speech generator 108 thereafter speaks the phrase, "Turn left where the white truck is turning left." Meanwhile, the context monitor 138 is initialized to run in the background and collect and interpret data from all subsystems. The context monitor 138 might infer, for example, that the traffic is unusually dense and notify the route guider 134 of that fact so that the timing and form of guidance inputs to the driver are modified appropriately (e.g., guidance for upcoming maneuvers might be presented sooner to allow time for lane changes in congested conditions).

Additional example scenarios include the following:

(1) From an on-going comparison of the GPS feed and the maneuver list's latitude-longitude (lat-lon) attributes, the context monitor 138 determines that the driver is approaching a maneuver point; the context monitor 138 sends a request and the lat-lon information to the matcher 142 for candidate visible objects; the matcher 142 retrieves the tracked objects in the target area and sends the top candidate (maybe more than one) to the route guider 134 (choice would be based on GPS, confidence in object type, also object type itself—using criteria in the matcher 142 for deciding what is a "helpful" object, and what is not); and the route guider 134 thereafter sends a response frame to speech generator 108.

(2) The context monitor 136 determines that the driver is approaching a maneuver point from an on-going comparison of the GPS feed and the maneuver list's lat-lon attributes; the context monitor 136 then determines that the maneuver point includes features from a maneuver graph; the context monitor 136 sends a request and the lat-lon information to the matcher 142 for candidate visible objects; the matcher 142 retrieves the tracked objects in the target area and sends the top candidate (maybe more than one, with choice criteria as noted in (1) above) to the route guider 134; and the route guider 134 then sends the response frame to speech generator 108.

(3) The context monitor 136 determines that the driver is in danger of missing a maneuver, estimated from the proximity/speed/lane and also from the time and content of the last driver request for info; the route guider 134 sends a request to the matcher 142 for visual aid to an upcoming maneuver point; the matcher 142 sends candidate(s) to the route guider 134 (with choice criteria as noted in (1) above); and the route guider 134 then sends the response frame to speech generator 108.

(4) The driver request refers to a currently visible object (currently visible status determined from query content/pragmatics); the matcher 142 gets the request from the route guider 134 about the specific object; if the matcher 142 finds a candidate, it checks against the GPS and sends the candidate information to the context monitor 136 with the GPS information; the context monitor 135 checks if the GPS information for the next maneuver matches the tracked object GPS information; if a match occurs, the information is sent to the route guider 134 which then sends the appropriate frame to the speech generator 108; if there is no match, a negative reply is sent to the route guider 134; and finally, if the driver is in danger of missing the turn (estimated due to proximity), the context monitor 136 sends a request to the matcher 142 for object/landmark matching maneuver points (see case 2 above).

As can be appreciated by one skilled in the art, the above examples are for illustrative purposes only as the invention is not intended to be limited thereto.

What is claimed is:

1. A navigation system, comprising:

a route planning module configured to receive a request from a user for guidance to a particular destination, and based on a starting point, determining a route from the starting point to the particular destination; and a route guidance module configured to receive the route from the route planning module, and based on the route and current location of the user, provide location-specific instructions to the user, where the location-specific instructions include reference to specific visible objects within the vicinity of the user; and wherein the route guidance module further comprises a vision module, the vision module being configured to receive a plurality of image frames and detect and track objects proximate to the navigation system that are represented in the image frames, such that each object is assigned a track identifier and is then tracked in subsequent image frames.

2. A navigation system as set forth in claim 1, wherein the route planning module further comprises a route planning dialog manager, where the route planning dialog manager is configured to receive an interpreted input utterance from a speech understanding system requesting guidance to a particular destination, and based on the starting point, the input utterance, and the particular destination, the route planning dialog manager generates a starting and stopping point on the user's route, and once generated, confirms with the user that the generated starting and stopping points are correct starting and stopping points.

3. A navigation system as set forth in claim 2, wherein the route planning module further comprises a navigation route server, wherein the navigation route server is configured to receive the starting and stopping points, and based on the starting and stopping points, generate a route with directional instructions from the starting point to the stopping point.

4. A navigation system as set forth in claim 3, where the route guidance module further comprises a vehicle position and heading module, wherein the vehicle position and heading module is configured to determine a specific location of the navigation system.

5. A navigation system as set forth in claim 4, wherein the route guidance module further comprises a context monitor, the context monitor being configured to receive and combine information pertaining to the route, the specific location of the navigation system, and objects being detected and tracked that are proximate to the navigation system, and based on the combination of the information, the context monitor is configured to generate situational data, the situational data being a continuously updated status of the navigation system and its current local situation.

6. A navigation system as set forth in claim 4, wherein the route guidance module further comprises a local object blackboard, where the local object blackboard is configured to receive the track identifier and maintain a record of track identifiers that are currently proximate to the navigation system, otherwise deleting the track identifiers.

7. A navigation system as set forth in claim 4, wherein the route guidance module further comprises a local reference matcher, the local reference matcher being configured to receive the track identifier, the specific location of the navigation system, and user specific instructions regarding objects proximate to the navigation system, and further configured to match the user specific instructions regarding objects proximate to the navigation system with a specific track identifier.

8. A navigation system as set forth in claim 5, wherein the route guidance module further comprises a route guidance dialog manager, where the route guidance dialog manager is configured to receive a combination of information consisting of an interpreted input utterance from the speech understanding system, the route, and the situational data, and based on the combination of information, generating a phrase selected from a group consisting of the phrase being generated in response to a reference to a specific visible object within the vicinity of the user, and the phrase including a reference to a specific visible object within the vicinity of the user.

9. A navigation system as set forth in claim 8, further comprising a speech generator, the speech generator being configured to receive the phrase from the route guidance dialog manager and convert the phrase into an audible, speech signal.

10. A navigation system as set forth in claim 1, further comprising an automobile with the route planning module and route guidance module affixed thereto, thereby creating a driver navigation system.

11. A navigation system as set forth in claim 1, further comprising a speech understanding system for receiving an input speech utterance from a user and converting the input speech utterance into an interpreted input utterance, the interpreted input utterance consisting of a semantically labeled phrase.

12. A computer implemented method for forming a navigation system, comprising:
    an act of encoding a memory of a processor with instruction means to include a route planning module and a route guidance module,
    wherein the route planning module is configured to receive a request from a user for guidance to a particular destination, and based on a starting point, determining a route from the starting point to the particular destination; and
    wherein the route guidance module configured to receive the route from the route planning module, and based on the route and current location of the user, provide location-specific instructions to the user, where the location-specific instructions include reference to specific visible objects within the vicinity of the user; and
    wherein the route guidance module is further configured to include a vision module and to receive a plurality of image frames and detect and track objects proximate to the navigation system that are represented in the image frames, such that each object is assigned a track identifier and is then tracked in subsequent image frames.

13. A method for forming a navigation system as set forth in claim 12, wherein the act of configuring the route planning module further comprises an act of configuring a route planning dialog manager to receive an interpreted input utterance from a speech understanding system requesting guidance to a particular destination, and based on the starting point, the input utterance, and the particular destination, the route planning dialog manager generates a starting and stopping point on the user's route, and once generated, confirms with the user that the generated starting and stopping points are correct starting and stopping points.

14. A method for forming a navigation system as set forth in claim 13, wherein the act of configuring the route planning module further comprises an act of configuring a navigation route server to receive the starting and stopping points, and based on the starting and stopping points, generate a route with directional instructions from the starting point to the stopping point.

15. A method for forming a navigation system as set forth in claim 14, where the act of configuring the route guidance module further comprises an act of configuring a vehicle position and heading module to determine a specific location of the navigation system.

16. A method for forming a navigation system as set forth in claim 15, wherein the act of configuring the route guidance module further comprises an act of configuring a context monitor to receive and combine information pertaining to the route, the specific location of the navigation system, and objects being detected and tracked that are proximate to the navigation system, and based on the combination of the information, the context monitor is configured to generate situational data, the situational data being a continuously updated status of the navigation system and its current local situation.

17. A method for forming a navigation system as set forth in claim 15, wherein the act of configuring the route guidance module further comprises an act of configuring a local object blackboard to receive the track identifier and maintain a record of track identifiers that are currently proximate to the navigation system, otherwise deleting the track identifiers.

18. A method for forming a navigation system as set forth in claim 15, wherein the act of configuring the route guidance module further comprises an act of configuring a local reference matcher to receive the track identifier, the specific location of the navigation system, and user specific instructions regarding objects proximate to the navigation system, and further configured to match the user specific instructions regarding objects proximate to the navigation system with a specific track identifier.

19. A method for forming a navigation system as set forth in claim 16, wherein the act of configuring the route guidance module further comprises an act of configuring a route guidance dialog manager to receive a combination of information consisting of an interpreted input utterance from the speech understanding system, the route, and the situational data, and based on the combination of information, generating a phrase selected from a group consisting of the phrase being generated in response to a reference to a specific visible object within the vicinity of the user, and the phrase including a reference to a specific visible object within the vicinity of the user.

20. A method for forming a navigation system as set forth in claim 19, further comprising an act of configuring a speech generator to receive the phrase from the route guidance dialog manager and convert the phrase into an audible, speech signal.

21. A method for forming a navigation system as set forth in claim 12, further comprising an act of configuring a speech understanding system to receive an input speech utterance from a user and converting the input speech utterance into an interpreted input utterance, the interpreted input utterance consisting of a semantically labeled phrase.

22. A method for forming a navigation system as set forth in claim 12, further comprising an act of affixing the route planning module and route guidance module to an automobile, thereby creating a driver navigation system.

23. A computer program product for navigating, the computer program product comprising computer-readable instruction means stored on a non-transitory computer-readable medium that are executable by a computer for causing the computer to:
receive a request from a user for guidance to a particular destination, and based on a starting point, determine a route from the starting point to the particular destination; and
based on the route and current location of the user, provide location-specific instructions to the user, where the location-specific instructions include reference to specific visible objects within the vicinity of the user; and
receive a plurality of image frames and detect and track objects proximate to the computer that are represented in the image frames, such that each object is assigned a track identifier and is then tracked in subsequent image frames.

24. A computer program product as set forth in claim 23, further comprising instruction means for causing the computer to receive an interpreted input utterance requesting guidance to a particular destination, and based on the starting point, the input utterance, and the particular destination, generate a starting and stopping point on the user's route, and once generated, confirms with the user that the generated starting and stopping points are correct starting and stopping points.

25. A computer program product as set forth in claim 24, further comprising instruction means for causing the computer to receive the starting and stopping points, and based on the starting and stopping points, generate a route with directional instructions from the starting point to the stopping point.

26. A computer program product as set forth in claim 25, further comprising instruction means for causing the computer to determine a specific location of the navigation system.

27. A computer program product as set forth in claim 26, further comprising instruction means for causing the computer to receive and combine information pertaining to the route, the specific location of the navigation system, and objects being detected and tracked that are proximate to the computer, and based on the combination of the information, the generating situational data, the situational data being a continuously updated status of the computer and its current local situation.

28. A computer program product as set forth in claim 26, further comprising instruction means for causing the computer to receive the track identifier and maintain a record of track identifiers that are currently proximate to the computer, otherwise deleting the track identifiers.

29. A computer program product as set forth in claim 26, further comprising instruction means for causing the computer to receive the track identifier, the specific location of the computer, and user specific instructions regarding objects proximate to the computer, and further comprising instruction means for causing the computer to match the user specific instructions regarding objects proximate to the computer with a specific track identifier.

30. A computer program product as set forth in claim 27, further comprising instruction means for causing the computer to receive a combination of information consisting of an interpreted input utterance, the route, and the situational data, and based on the combination of information, generating a phrase selected from a group consisting of the phrase being generated in response to a reference to a specific visible object within the vicinity of the user, and the phrase including a reference to a specific visible object within the vicinity of the user.

31. A computer program product as set forth in claim 30, further comprising instruction means for causing the computer to convert the phrase into an audible, speech signal.

32. A computer program product as set forth in claim 23, further comprising instruction means for causing the computer to receive an input speech utterance from a user and convert the input speech utterance into an interpreted input utterance, the interpreted input utterance consisting of a semantically labeled phrase.

33. A navigation system, comprising:
a route planning module configured to receive a request from a user for guidance to a particular destination, and based on a starting point, determining a route from the starting point to the particular destination;
a route guidance module configured to receive the route from the route planning module, and based on the route and current location of the user, provide location-specific instructions to the user, where the location-specific instructions include reference to specific visible objects within the vicinity of the user;
a speech understanding system for receiving an input speech utterance from a user and converting the input speech utterance into an interpreted input utterance, the interpreted input utterance consisting of a semantically labeled phrase;

wherein the route planning module further comprises a route planning dialog manager, where the route planning dialog manager is configured to receive an interpreted input utterance from a speech understanding system requesting guidance to a particular destination, and based on the starting point, the input utterance, and the particular destination, the route planning dialog manager generates a starting and stopping point on the user's route, and once generated, confirms with the user that the generated starting and stopping points are correct starting and stopping points;

wherein the route planning module further comprises a navigation route server, wherein the navigation route server is configured to receive the starting and stopping points, and based on the starting and stopping points, generate a route with directional instructions from the starting point to the stopping point;

wherein the route guidance module further comprises a vehicle position and heading module, wherein the vehicle position and heading module is configured to determine a specific location of the navigation system;

wherein the route guidance module further comprises a vision module, the vision module being configured to receive a plurality of image frames and detect and track objects proximate to the navigation system that are represented in the image frames, such that each object is assigned a track identifier and is then tracked in subsequent image frames;

wherein the route guidance module further comprises a context monitor, the context monitor being configured to receive and combine information pertaining to the route, the specific location of the navigation system, and objects being detected and tracked that are proximate to the navigation system, and based on the combination of the information, the context monitor is configured to generate situational data, the situational data being a continuously updated status of the navigation system and its current local situation;

wherein the route guidance module further comprises a local object blackboard, where the local object blackboard is configured to receive the track identifier and maintain a record of track identifiers that are currently proximate to the navigation system, otherwise deleting the track identifiers;

wherein the route guidance module further comprises a local reference matcher, the local reference matcher being configured to receive the track identifier, the specific location of the navigation system, and user specific instructions regarding objects proximate to the navigation system, and further configured to match the user specific instructions regarding objects proximate to the navigation system with a specific track identifier;

wherein the route guidance module further comprises a route guidance dialog manager, where the route guidance dialog manager is configured to receive a combination of information consisting of an interpreted input utterance from the speech understanding system, the route, and the situational data, and based on the combination of information, generating a phrase selected from a group consisting of the phrase being generated in response to a reference to a specific visible object within the vicinity of the user, and the phrase including a reference to a specific visible object within the vicinity of the user;

a speech generator, the speech generator being configured to receive the phrase from the route guidance dialog manager and convert the phrase into an audible, speech signal; and an automobile with the route planning module, route guidance module, speech understanding system, and speech generator affixed thereto, thereby creating a driver navigation system.

* * * * *